United States Patent
Page (10) Patent No.: US 6,903,871 B2
(45) Date of Patent: Jun. 7, 2005

(54) RECONFIGURABLE SURFACE

(76) Inventor: Derrick John Page, 1645 Severn Chapel Rd., Crownville, MD (US) 21032

(*) Notice: Subject to any disclaimer, the term of this patent is extended or adjusted under 35 U.S.C. 154(b) by 0 days.

(21) Appl. No.: 10/041,986

(22) Filed: Jan. 9, 2002

(65) Prior Publication Data
US 2003/0130817 A1 Jul. 10, 2003

(51) Int. Cl.[7] .......................... G03B 21/56; G02F 0/01; G02F 1/03; G02F 5/00
(52) U.S. Cl. ...................... 359/443; 359/277; 359/446; 359/451; 359/893
(58) Field of Search ................ 359/443, 277, 359/446, 451, 893

(56) References Cited

U.S. PATENT DOCUMENTS

| | | | | |
|---|---|---|---|---|
| 3,400,478 A | * | 9/1968 | O'Keefe | 40/447 |
| 4,005,932 A | * | 2/1977 | Gates | 353/6 |
| 4,536,980 A | * | 8/1985 | Fleming | 40/427 |
| 4,654,989 A | * | 4/1987 | Fleming | 40/427 |
| 5,159,362 A | * | 10/1992 | Monroe et al. | 352/85 |
| 5,793,918 A | * | 8/1998 | Hogan | 385/116 |
| 5,796,620 A | * | 8/1998 | Laskowski et al. | 700/197 |
| 6,298,587 B1 | * | 10/2001 | Vollom | 40/427 |

* cited by examiner

Primary Examiner—Rodney Fuller
Assistant Examiner—Magda Cruz
(74) Attorney, Agent, or Firm—H. C. Lin (57) ABSTRACT

A three-dimensional surface shape is produced from input numerical data. The shape of a sheet elastic material is determined by the positions of a matrix of control rods. The position of each of the rods is determined by a computer-controlled system. Each rod is fitted with two pneumatically controlled locking mechanisms, one for the X coordinate and one for the Y coordinate. When both locks on a particular rod are released the rod is free to move to a new position determined by an elevator. Once all of the rods have been adjusted they are locked in position and the surface has been configured. In one application, the surface can be used as a mold for casting a replica or in another application can be used as the screen in an image projection system.

9 Claims, 8 Drawing Sheets

RECONFIGURABLE SURFACE

BACKGROUND OF THE INVENTION

1. Field of the Invention

This invention relates to the forming of a three-dimensional surface using data from a computer.

2. Description of the Prior Art

Three-dimensional surfaces may be produced in a number of ways. For instance, a computer controlled milling machine can be employed to machine a surface that has been described by numerical input data. The surface can be milled on a variety of materials such as metals, plastics or wood. Alternatively, stereo-lithographic machines have been developed that use lasers to cross-link polymer material. The position of the laser beam relative to the polymer liquid is controlled by a computer system using input data that describes the required surface.

In these prior arts, once the surface has been produced, it can no longer be reconfigured.

SUMMARY OF THE INVENTION

An object of this invention is to produce a three-dimensional surface from numerical data. Another object of this invention is to produce a three-dimensional surface, which is reconfigurable.

I describe in this invention a means of producing a three-dimensional surface from numerical data. Unlike the previous approaches, once the surface has been produced it can be reconfigured repeatedly into other shapes as required. This invention can be applied to a large number of applications, including the production of topological maps, as molds for casting surfaces, and for three-dimensional variable images.

I provide a device that can produce a three-dimensional surface shape from input numerical data. The shape of a sheet elastic material is determined by the positions of a matrix of control rods. The position of each of the rods is determined by a computer-controlled system. Each rod is fitted with two pneumatically controlled locking mechanisms, one for the X coordinate and one for the Y coordinate. When both locks on a particular rod are released the rod is free to move to a new position determined by an elevator. Once all of the rods have been adjusted they are locked in position and the surface has been configured. In one application, the surface can be used as a mold for casting a replica or in another application can be used as the screen in an image projection system.

DETAILED DESCRIPTION OF THE PREFERRED EMBODIMENT

Figure 1:
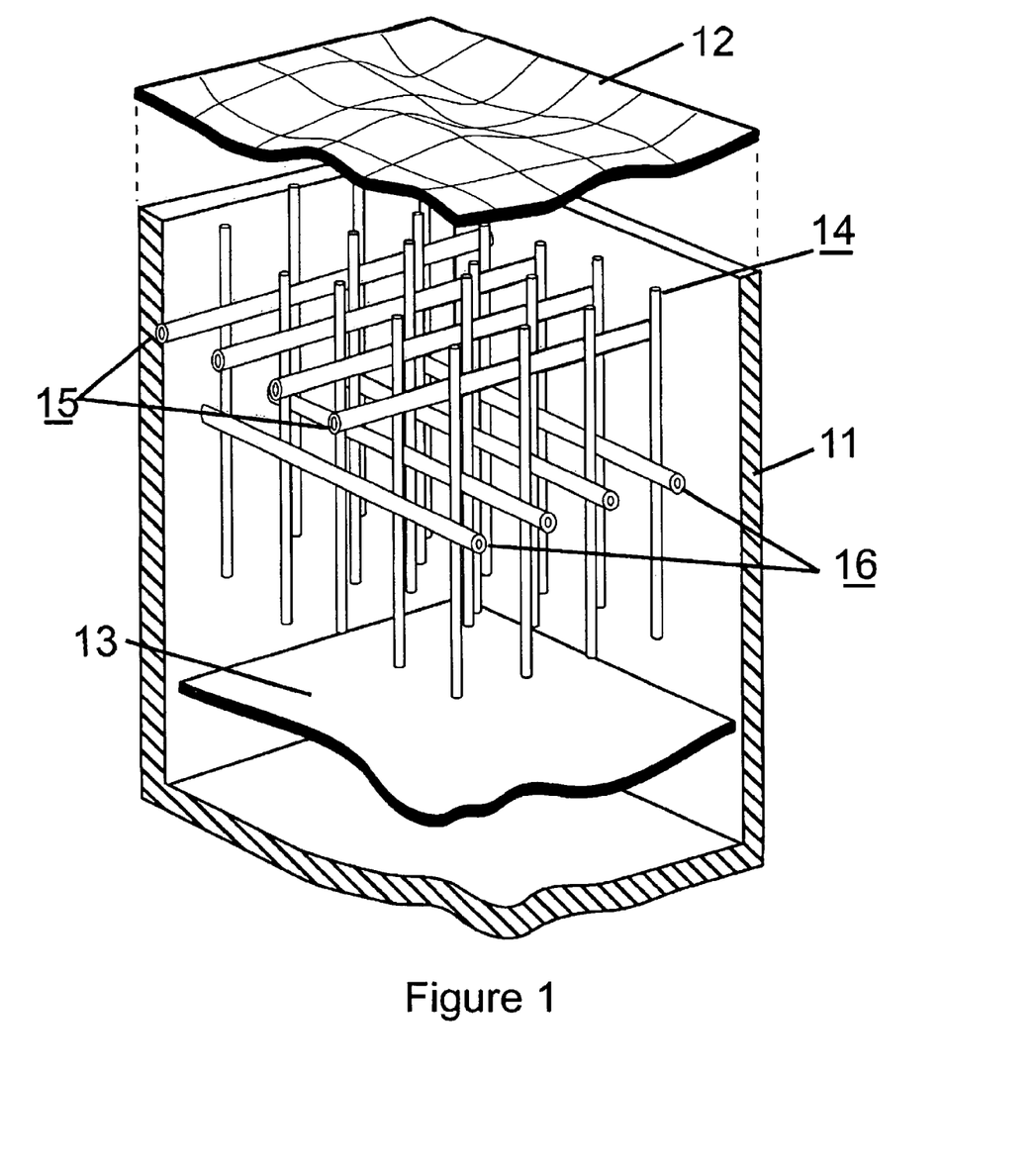
FIG. 1 shows the basic components of the reconfigurable system.

FIG. 1 shows elements of the preferred invention. The mechanism is designed to produce a three-dimensional surface shape from a set of numerical data. The surface can be repeatedly reshaped to other sets of data as required. A flexible elastic sheet 12 is shown resting on an array of control rods 14 and mounted by the edges to an enclosure 11. Enclosure 11 is airtight and is fitted with an exhaust pump (not shown). The reduced pressure inside the enclosure causes the sheet 12 to be sucked down onto the ends of the set of control rods 14 thereby exerting a downward force on the end of each rod. An elevator 13 is mounted within the enclosure and is able to move up and down on command by means of a computer controlled hydraulic or electrical drive system (not shown). Any or all of the pneumatic tubes in two sets 15 an 16 can be inflated to lock any or all of the control rods in position.

Figure 2A:
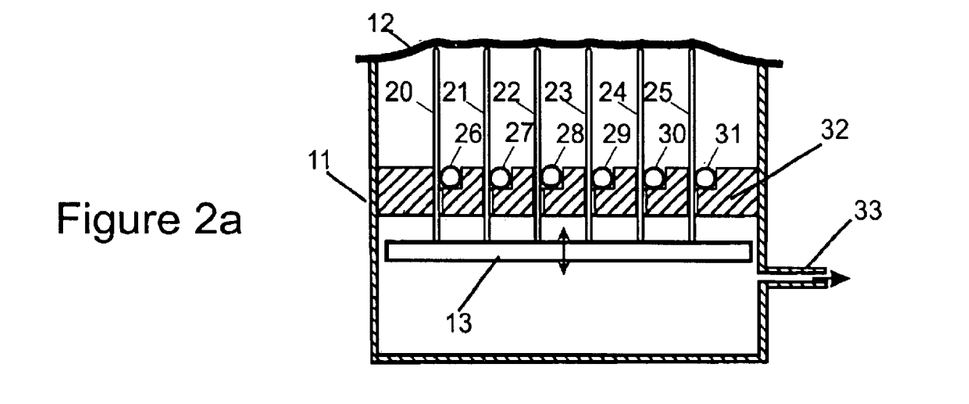
FIG. 2 shows a sequence of operations used to form a configured surface.
Figure 2B:
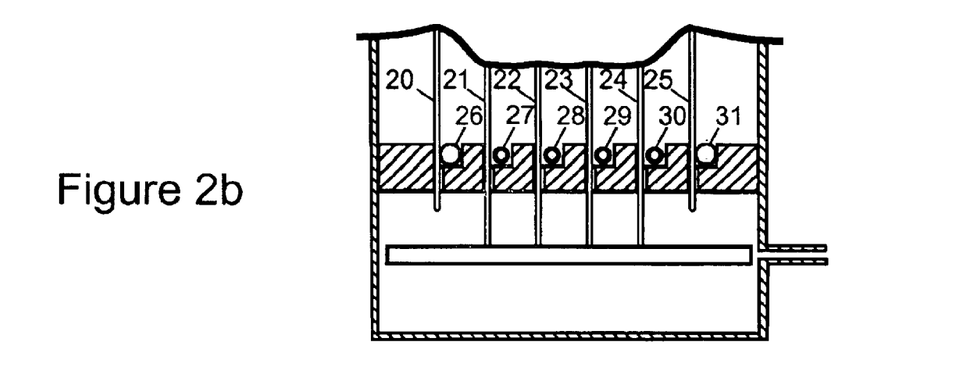
Figure 2C:
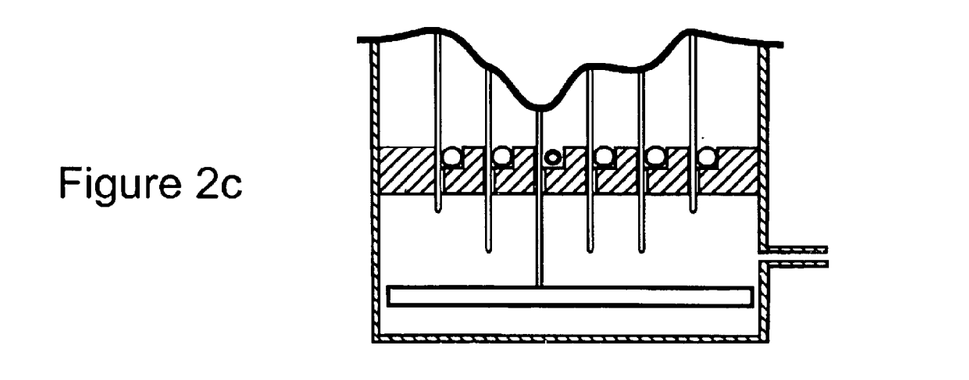

FIG. 2 shows a sequence of movements that demonstrate the operation of the invention. The controlled sequence of locking and unlocking of the control rods and the controlled movement of the elevator 13 can form a desired shape in the flexible elastic sheet 12. To form a shaped surface all the pneumatic tubes are first deflated and the elevator is moved to the upper start position as shown in FIG. 2a. The pressure is then reduced in the enclosure by extracting some air via port 33. Next a selected number of pneumatic tubes are inflated to lock selected rod in position. In this example tubes 26 and 31 are inflated, immobilizing rods 20 and 25. The elevator is then moved to a lower position and the unlocked rods move down with the elevator. This positioning is shown in FIG. 2b. At this point pneumatic tubes 27, 29 and 30 are inflated thereby locking control rods 21, 23 and 24. The elevator is then moved down further and control rod 22, being unlock, moves to a lower position as shown in FIG. 2c. The desired shape has now been attained and all the pneumatic tubes can now be inflated to fix the surface in position.

A new shape can be "written" into the sheet by releasing the pressure in all of the tubes and releasing all of the rods. The elevator can then be moved up with all of the rods to the starting position. A new programming sequence can then be initiated.

Figure 3:
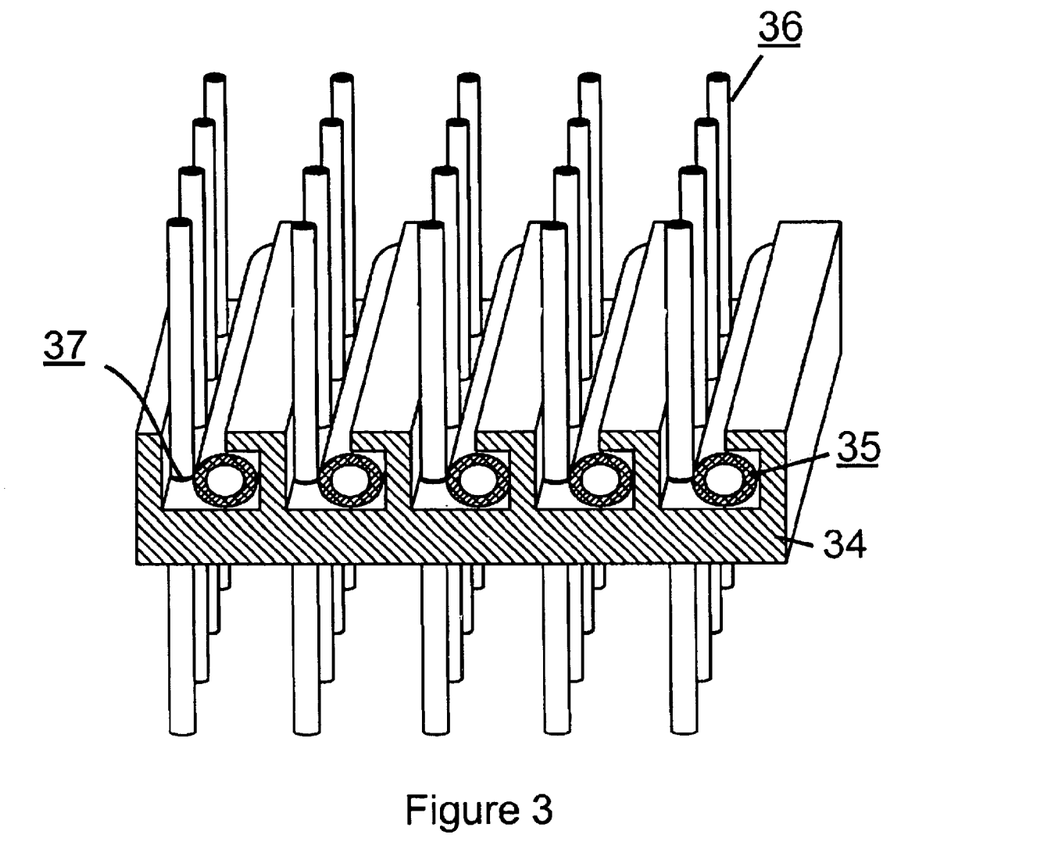
FIG. 3 shows the pneumatic locking mechanism used to control the positions of the control rods.

FIG. 3 illustrates a method of holding the control rods. A guide 34 fitted with a set of holes 37 into which the set of control rods 36 is threaded. The un-inflated set of pneumatic tubes 35 are arranged to be in close proximity to the control rods. When the pneumatic tubes are inflated, they expand and increase in diameter and press against the side of the control rods. The rods are pushed against the sides of the guide thereby preventing them from moving up or down in the guide due to the increased friction. Once the pressure is reduced in a pneumatic tube, it will contract and all of the rods that were in contact with that tube will be free once again to move up and down in the guide.

Figure 4:
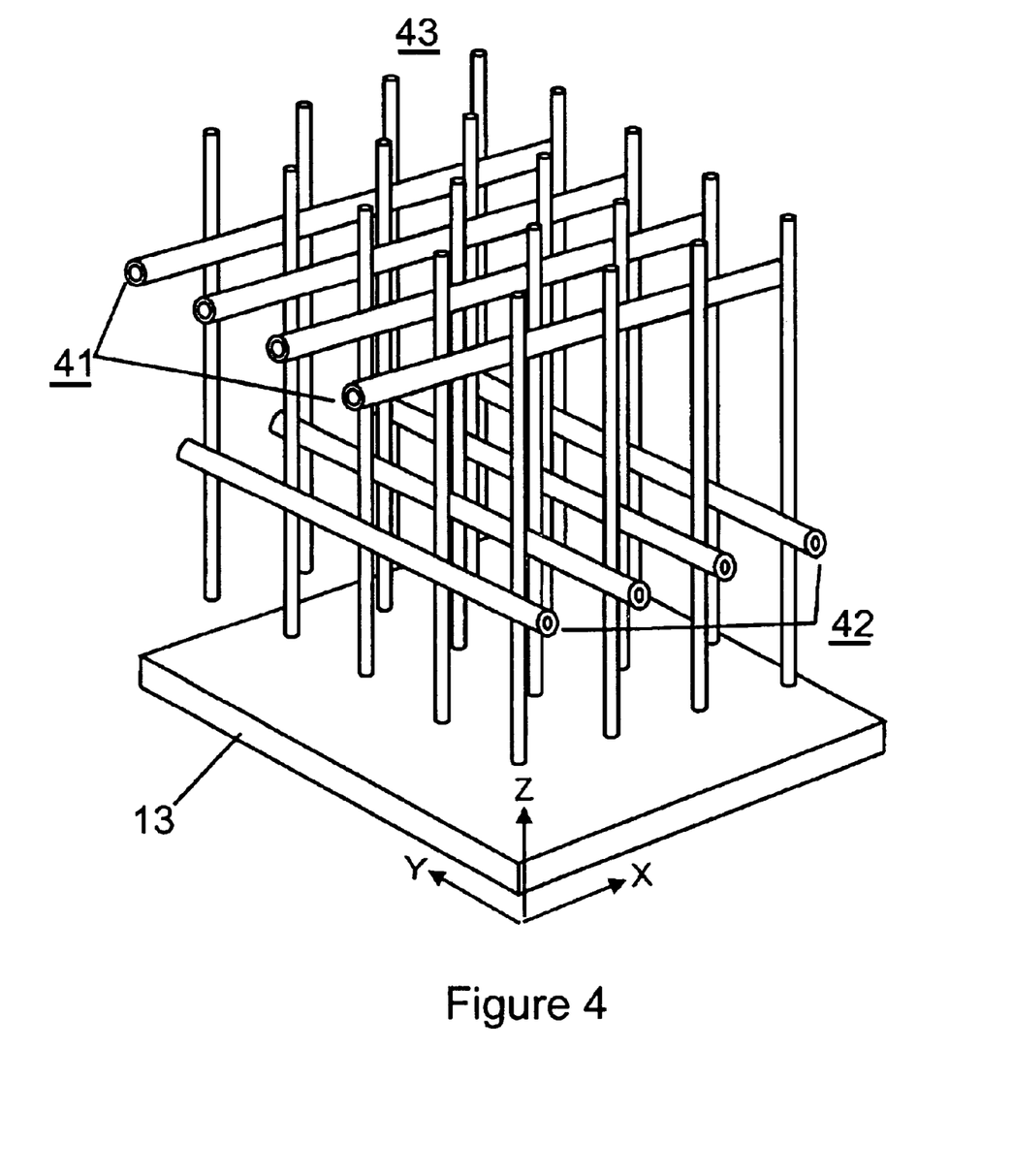
FIG. 4 is a schematic showing the two orthogonal sets of pneumatic tubes used to selectively lock the control rods in an X-Y matrix.

In order to be able address individual rods arranged in an X-Y matrix of rods, two orthogonal sets of pneumatic tubes, 41 and 42, must be employed. This is illustrated in FIG. 4. Here an X-Y matrix of rods 43 is shown. Tubes of set 42 are inflated in accordance with the X data and tubes of set 41 with the Y data. For an individual rod to be released, both the corresponding X and Y tubes must be deflated. Once released, the rod's vertical position Z will be determined by the position of the elevator 13.

One method of positioning the control rods is to "write" a row at a time. If the rows are designated by X and the columns by Y, then a particular column $Y_n$ can be deflated and all rows with rods required to be moved, (e.g. $X_2$, $X_7$, $X_{20}$, $X_{25}$ ...) can be deflated simultaneously. The rods will all drop to a new position determined by the position of the elevator. All the rods can be relocked and the process repeated for another column and so on. Once the whole matrix has been addressed for a particular value of Z governed by the elevator position, the elevator can be moved down again and the whole process repeated for a series of Z positions. Once the surface has been written, the rods can be locked in their final positions.

Figure 5:
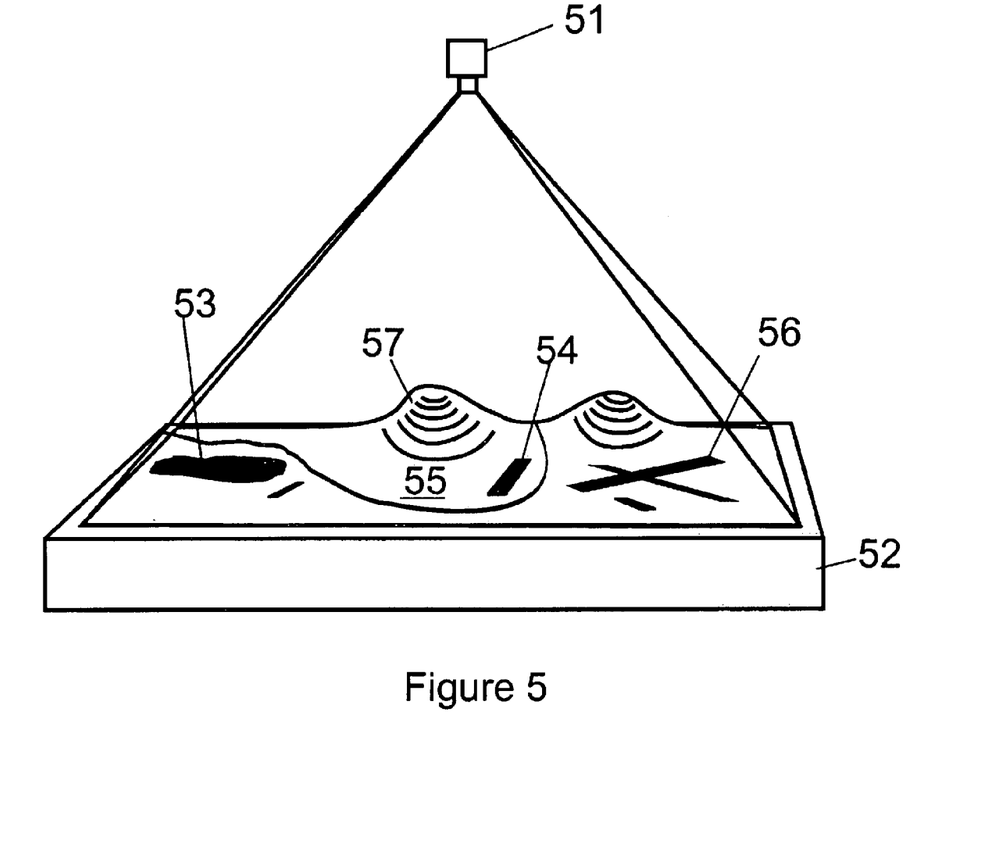
FIG. 5 shows a projector shining an image onto the configurable surface.

There are many applications for this invention. One is the creation of three-dimensional contour maps. FIG. 5 shows the basic elements of a projection system combined with the computer controlled adjustable surface. Here the projector 51 shines an image of geographic features onto the adjustable surface 55. As an example, the surface can be programmed to produce mountain 57 and lake 53 and building 54 and airfield 56 can be projected onto the surface of a screen 52.

Figure 6:
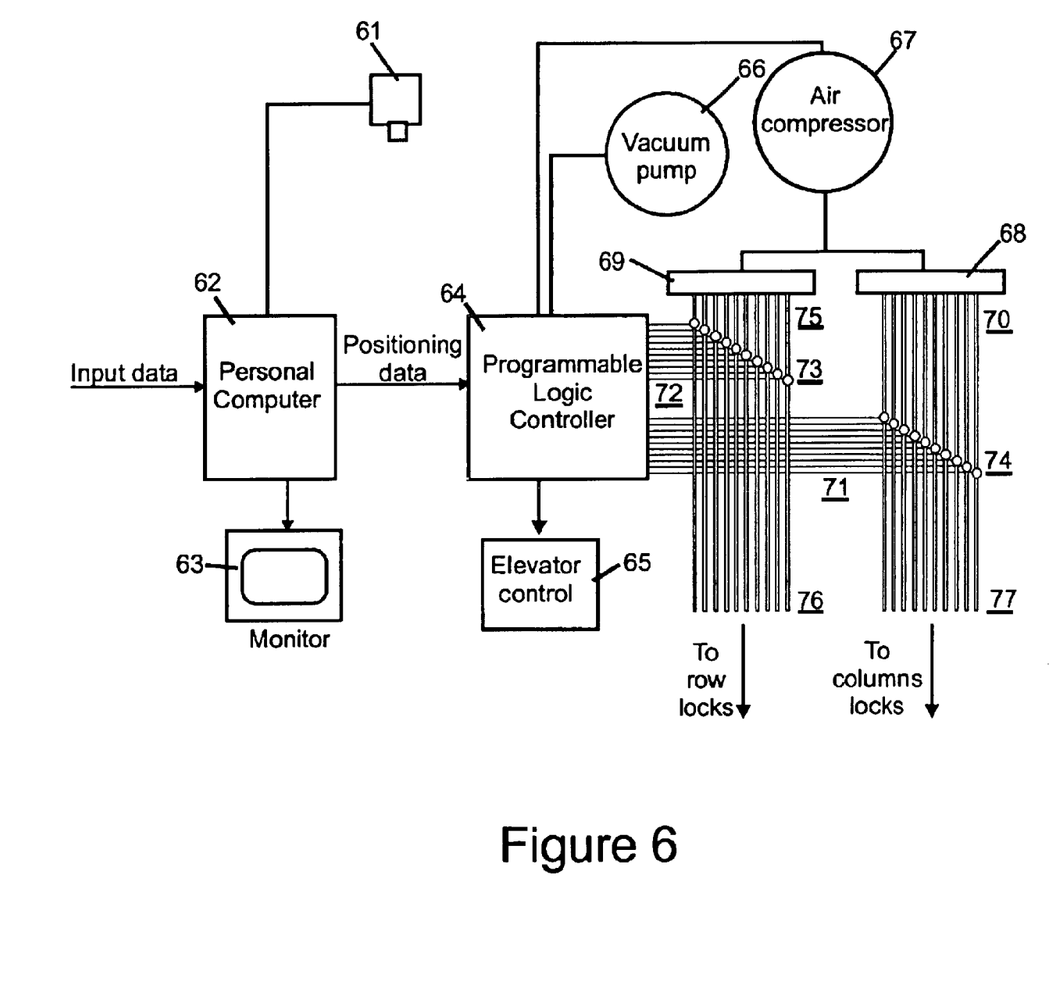
FIG. 6 is a schematic of the control system for the configurable surface.

FIG. 6 shows a schematic layout of the control system for the reconfigurable surface. Input data representing the contour to be produce together with any surface features are fed into the personal computer 62. The personal computer is programmed to develop the imaging that is fed to projector 61 and to monitor 63. The computer also derives the positioning data for the reconfigurable surface and this is fed to programmable logic controller 64. The programmable logic controller sends signals to the elevator control 65, to the vacuum pump 66 and to the air compressor 67. The air compressor, via a storage tank not shown, provides compressed air to manifolds 68 and 69. Solenoid valve sets 73 and 74 are connected via sets of pipes 75 and 70 to the manifolds. Pipe sets 76 and 77 are of flexible elastic material such as latex rubber and form part of the locking mechanism for the control rods. The programmable logic controller 64 provides the electrical signals to solenoid sets 73 and 74 via electrical connection sets 72 and 71.

Figure 7:
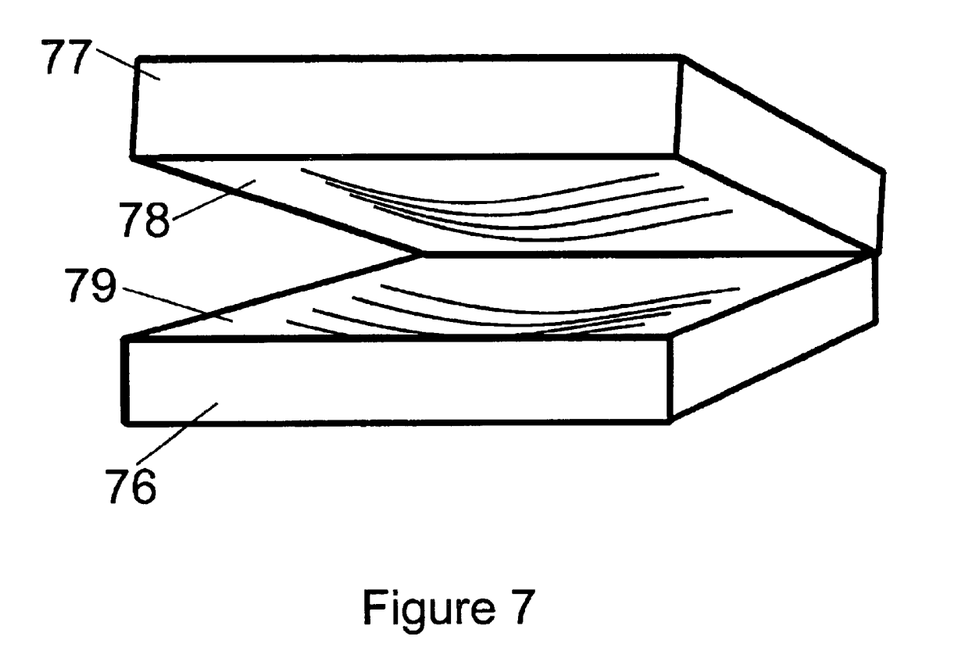
FIG. 7 shows the arrangement of two configurable surfaces forming a mold to cast an object.

In the application where the reconfigurable surface concept is applied to casting or injection molding of parts, the reconfigurable surfaces may be arranged in a clam shell fashion as shown in FIG. 7. Here the two reconfigurable surfaces 78 and 79 are mounted in housings 76 and 77. The housings may be brought together and the space between them filled with appropriate material in liquid or paste form, which upon hardening will form the desired part.

Figure 8:
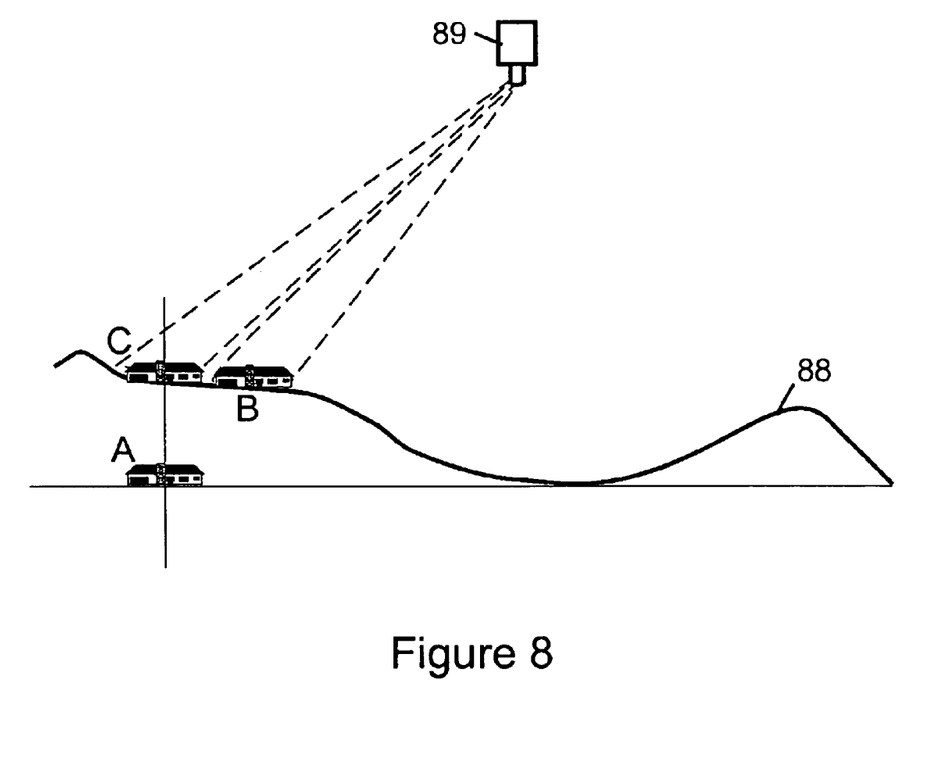
FIG. 8 shows a projector shining an image onto a configurable surface and producing an error in the position of an object.

In the case where the reconfigurable surface forms a contour map and geographical features are added by projecting them onto the surface, some positioning errors can occur. For example, in FIG. 8 the house projected by the projector 89 onto surface 88 may have a true horizontal coordinate at position A, but due to the contour of surface 88, the image of the house will appear at position B. The house positioning data that is fed to the projector may be modified by the computer controller, using the contour data, to produce a corrected image for the house at position C.

Because the control rods are kept in place by the flexible rubber sheet and the use of a partial vacuum, the enclosure can be used in any orientation. It can be oriented as a tabletop or as screen on a wall.

Another variation for the tabletop orientation would be to dispense with the flexible rubber sheet all together and let the natural weight of the control rods provide the force to move the rods down.

Although the preferred embodiment has the control rods arranged perpendicular to a planar surface, other arrangements are possible. For example, the control rods may be arranged to move in and out of a cylindrical surface. Such an arrangement could be used for fabricating round objects.

What is claimed is:

1. A reconfigurable surface, comprising:

a flexible surface;

a matrix of rods for contouring said flexible surface to a desired shape, wherein said flexible surface is supported by the tips of said rods and each rod of said rods is movable in a vertical direction against said flexible surface and is locked in position when elevated to a predetermined position, and wherein each rod of said rods is fitted with two pneumatically controlled locks, which release a particular rod to move freely by coincident addressing; and an elevator, on which rest the bottom ends of said rods which are unlocked.

2. The reconfigurable surface as described in claim 1, wherein said elevator is reset at the topmost position with all the locks released.

3. The reconfigurable surface as described in claim 2, wherein the rods, which are coincidentally addressed, are backed as the elevator descends.

4. A reconfigurable surface, comprising:

a flexible surface;

a matrix of rods far contouring said flexible surface to a desired shape, wherein said flexible surface is supported by the tips of said rods, and said flexible surface is sucked against said tips; and a chamber for housing said rods and evacuated for creating a suction of said flexible surface against said tips of said rods.

5. The reconfigurable surface as described in claim 4, further comprising inflatable tubes to serve as brakes to lock the rods in position when inflated.

6. The reconfigurable surface as described in claim 5, wherein said tubes are aligned in two dimensions for coincident addressing.

7. The reconfigurable surface as described in claim 6, where said tubes are aligned in two orthogonal directions.

8. The reconfigurable surface as described in claim 6, further comprising a frame having via holes for guiding said rods, and having horizontal grooves for holding said tubes.

9. A reconfigurable surface, comprising:

a flexible surface;

a matrix of rods for contouring said flexible surface to a desired shape, wherein reconfigurable surface serves a screen in an image projection system; and geographical features are optically projected from a projector onto said flexible surface, and computer means to correct the offset of horizontal positioning of said features due to the topology of said-flexible surface.

* * * * *